United States Patent [19]

Sung et al.

[11] Patent Number: 5,202,056
[45] Date of Patent: Apr. 13, 1993

[54] COMPOSITION OF MATTER FOR OLIGOMERIC ALIPHATIC ETHERS AS ASPHALTENE DISPERSANTS

[75] Inventors: Rodney L. Sung, Fishkill, N.Y.; Thomas F. Derosa, Passaic; David A. Storm, Montvale, both of N.J.; Benjamin J. Kaufman, Hopewell Jct., N.Y.

[73] Assignee: Texaco Inc., White Plains, N.Y.

[21] Appl. No.: 814,533

[22] Filed: Dec. 30, 1991

[51] Int. Cl.$^5$ .................. B01F 17/00; C10C 3/02; C01L 1/26
[52] U.S. Cl. ...................... 252/351; 524/64; 106/284.1; 208/22; 44/280; 44/281
[58] Field of Search .................. 252/311.5, 351, 8.511, 252/8.513; 524/64; 106/284.2; 44/280, 281; 208/44, 22

[56] References Cited

U.S. PATENT DOCUMENTS

| | | | |
|---|---|---|---|
| 3,004,057 | 10/1961 | Nunn | 252/351 X |
| 3,391,228 | 7/1968 | Nehmsmann et al. | 252/351 X |
| 3,682,988 | 8/1972 | Lewis | 554/79 |
| 3,799,956 | 3/1974 | Nakamura et al. | 252/351 X |
| 4,399,024 | 8/1983 | Fukui et al. | 208/22 X |
| 4,757,833 | 7/1988 | Danley | 137/13 |
| 4,775,489 | 10/1988 | Watkins et al. | 252/8.552 |
| 5,013,462 | 5/1991 | Danley | 252/8.554 |
| 5,075,361 | 12/1991 | Derosa et al. | 524/64 |
| 5,132,005 | 7/1992 | DeRosa et al. | 208/22 X |
| 5,133,781 | 7/1992 | DeRosa et al. | 208/22 X |

FOREIGN PATENT DOCUMENTS

| | | | |
|---|---|---|---|
| 59-004690 | 1/1984 | Japan | 44/280 |
| 0471025 | 9/1978 | U.S.S.R. | 208/44 |

Primary Examiner—Robert L. Stoll
Assistant Examiner—Daniel S. Metzmaier
Attorney, Agent, or Firm—James J. O'Loughlin; Vincent A. Mallare

[57] ABSTRACT

A composition of matter useful as an asphaltene dispersant, comprising a mixture of:
(a) poly[di(propylene oxide-400)phosphite]-g-poly(propylene oxide-400) alcohol;
(b) poly[di(propylene oxide-1000)phosphite]-g-poly(propylene oxide-400) alcohol;
(c) poly[di(propylene oxide-400)phosphite]-g-poly(propylene oxide-1000) alcohol;
(d) poly[di(propylene oxide-1000)phosphite]-g-poly(propylene oxide-1000) alcohol;
(e) poly{star[di(propylene oxide-400)phosphite]-g-poly(propylene oxide-400)} alcohol;
(f) poly{star[di(propylene oxide-1000)phosphite]-g-poly(propylene oxide-400)} alcohol;
(g) poly{star[di(propylene oxide-400)phosphite]-g-poly(propylene oxide-1000) } alcohol; and
(h) poly{star[di(propylene oxide-1000)phosphite]-g-poly(propylene oxide-1000)} alcohol.

1 Claim, No Drawings

COMPOSITION OF MATTER FOR OLIGOMERIC ALIPHATIC ETHERS AS ASPHALTENE DISPERSANTS

BACKGROUND OF THE INVENTION

This invention is related to a composition of matter used for the compatibilization of asphaltenes in natural and processed bituminous liquids utilizing pendant groups that behave as solubilizers and dispersants to the asphaltenes.

Optimum petroleum refining is achieved when useful chemical conversion is conducted while minimizing energy input into the process. There are, however, intrinsic limits to this processing scenario. For example, asphaltenes comprise 10% to 20% of crude oil and their conversion to useful chemical agents is extremely limited. Moreover, the presence of heteroatoms and metal atoms encapsulated in asphaltene nuclei are known environmental toxins, especially when concentrated.

Asphaltenes are those ubiquitous materials comprising between 10 weight percent and 20 weight percent of crude petroleum. They may be superficially characterized as being readily soluble in carbon disulfide but insoluble in paraffinic naphtha. They have resisted any in-depth structural characterization for a variety of reasons including, especially, their predisposition to linear "stacking." By virtue of their presence in relatively high concentrations, there is a strong economic impetus for both further delineating their structure and investigating methods to increase their conversions to useful materials.

An object of this invention is to provide a method of stabilizing asphaltenes in Bunker "C" oil.

A further object of this invention is to provide a method of stabilizing asphaltenes in Bunker "C" oil containing Light Recycle Gas Oil.

DISCLOSURE STATEMENT

In searching extensively through prior art references and materials, applicants did not uncover any relevant prior art that pertains to the present invention.

SUMMARY OF THE INVENTION

This invention provides a method of compatibilizing asphaltenes containing bituminous liquids.

The composition of matter comprises a mixture of materials of:
(a) poly[di(propylene oxide-400)phosphite]-g-poly(propylene oxide-400) alcohol;
(b) poly[di(propylene oxide-1000)phosphite]-g-poly(propylene oxide-400) alcohol;
(c) poly[di(propylene oxide-400)phosphite]-g-poly(propylene oxide-1000) alcohol;
(d) poly[di(propylene oxide-1000)phosphite]-g-poly(propylene oxide-1000) alcohol;
(e) poly{star[di(propylene oxide-400)phosphite]-g-poly(propylene oxide-400)} alcohol;
(f) poly{star[di(propylene oxide-1000)phosphite]-g-poly(propylene oxide-400)} alcohol;
(g) poly{star[di(propylene oxide-400)phosphite]-g-poly(propylene oxide-1000)} alcohol; and
(h) poly{star[di(propylene oxide-1000)phosphite]-g-poly(propylene oxide-1000)} alcohol.

These eight materials are structurally represented in the order named as;

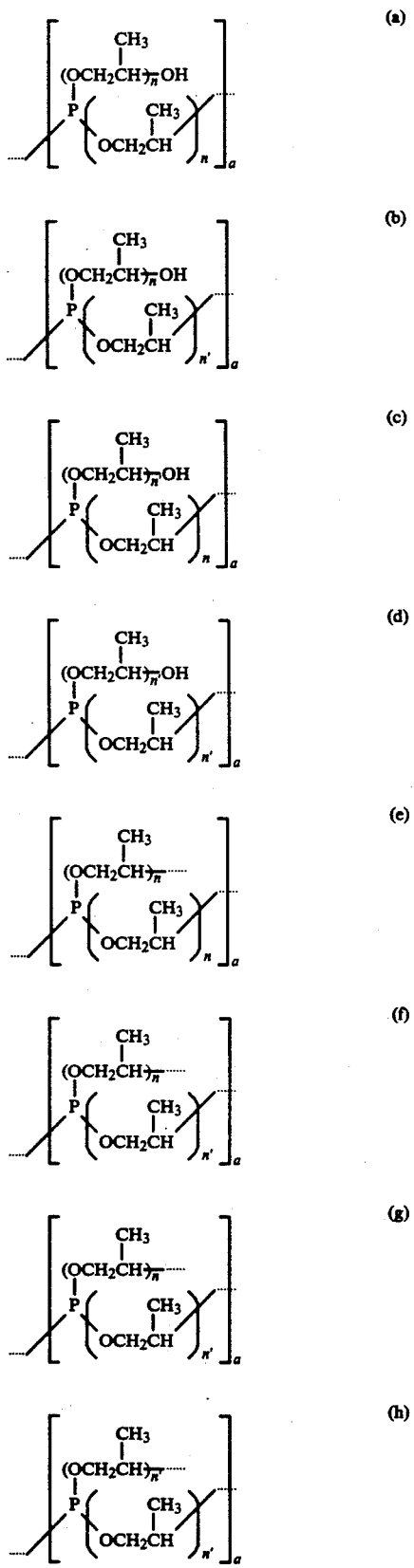

In the above formulas, $n = 4-8$ and $n' = 14-20$; and a and b may vary from 1 to 1000.

DETAILED DESCRIPTION OF THE INVENTION

Asphaltenes are components of the bitumen in petroleum, petroleum products, and other bituminous materials which are soluble in carbon disulfide but insoluble in paraffin naphtha. The physical and chemical characteristics of asphaltenes have been the subject of considerable investigation for at lest a century. The asphaltene molecule appears to carry a core of approximately five stacked flat sheets of condensed aromatic rings, one above the other giving an overall height of 16–20 angstroms. The average sheet diameter appears to be about 8.5 to 15 angstroms. The molecular weight of petroleum asphaltenes ranges from about 1,000 to 10,000.

Shale oil asphaltenes appear to have a lower molecular weight.

Qualitative and semiquantitative detection of asphaltenes and bituminous liquids, e.g., petroleum and petroleum derived liquids, is conventionally carried out by observing the precipitation of asphaltenes by naphtha addition.

The presence of asphaltenes in bituminous liquid, e.g., petroleum crude, refinery streams, and other natural and processed bituminous liquids, is well known as are the problems resolving from the presence and precipitation of the asphaltenes. In petroleum production, for example, it has long been known that asphaltenes may, under some circumstances, precipitate to form a sludge which plugs up the oil bearing formation and prevents the recovery of additional petroleum. Sludge in such compositions is known to form in petroleum bearing formations, on valves, pump impellers, in conduits, and in other bituminous liquid handling equipment.

Generally, it is regarded as an advantage to keep the asphaltenes in a stable suspension in the bituminous liquid until well into the refining process. This not only increases the ultimate yield, but prevents or reduces maintenance problems and also improves productivity from bituminous liquid bearing formations.

The dispersant is prepared by reacting a phosphorus trihalide with a mixture of polypropylene glycols. The polypropylene glycols, namely, PPG-400 and PPG-1000, have molecular weights of 400 and 1000 atomic molecular units (amu's), respectively, structurally represented below:

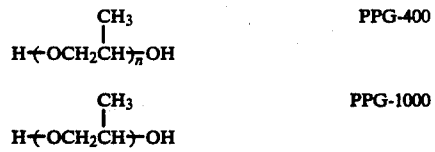

Both materials i.e., trademarks PPG-400 and PPG-1000, are produced and sold by Texaco Chemical Company of Austin, Tex.

One or two weight percent of the dispersant is blended with unmodified asphaltenes. The phosphite dispersant is an admixture of tri(aliphatic polyether) phosphite and an oligomeric di- and tripoly(aliphatic ether-co-phosphite). The novel dispersant is characterized as possessing linear and trigonal phospho-oxygen bonding as indicated by 31P-NMR and a molecular weight of from approximately 3000 amu to 30,000 amu.

The method used to prepare this phosphite catalyst is described below in a single step process.

Oligomeric and poly(aliphatic ether) phosphites are prepared directly by reacting phosphorus trihalide and a poly(alkoxylene) diol neat or in an inert solvent. The linear and star polymeric components are shown below.

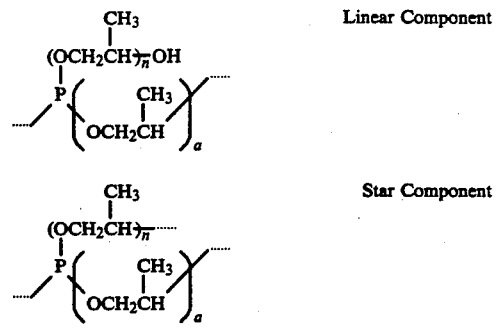

In order to show the effectiveness of the present invention and its advantages, the following examples are provided.

EXAMPLE I

Synthesis of Poly(Propylene Oxide)Phosphites

A sufficient amount of poly(propylene oxide)-diol having a number average molecular weight of approximately 1000 amu is mixed with THF so that vigorous mechanical agitation is possible when the solution s cooled to 0° to −5° C. using brine. The corresponding stoichiometric amount of phosphorous trichloride is added to THF and the mixture added dropwise at such a rate that the temperature never exceeds 10° C. When the addition has been completed, the reagent mixture is permitted to come to ambient temperature; and then heated to reflux temperature for at least 1 hour. The solvent is flashed over and clear viscous fluid isolated.

EXAMPLE II

Preparation of Asphaltene Blends

Asphaltenes blended with the novel phosphite catalyst were obtained by extracting from Bunker C oil using n-heptane and were thoroughly dried and ground to 40 mesh. To ensure a intimate mixing of blends, a 1 weight percent of phosphite catalyst and asphaltene were added to THF and the mixture heated to reflux. The mixture was subsequently cooled and the solvent flashed off. In this example, the structural characterization was performed using 1H-, 13C-, and 31P-NMR and FTIR; and the GPC and VPO were performed to characterize number molecular weights.

The novel reaction products of this invention were evaluated according to the Spot Test as outlined in the ASTM D 2781 test method. In the spot test, Bunker "C" oil or Bunker "C" blend containing Light Recycle Gas Oil and the modified or unmodified asphaltene are heated to 150° C. for a specified time and the sample removed and agitated for a specified duration. One drop of the mixture is placed onto a sheet of filter paper using a glass rod. The filter paper is baked in the oven and oil diffuses radically from the point of addition to give a uniform brown circle. Any asphaltenes which have precipitated during this process appear as a ring of darker material. The sample is rated using integers on a scale of one though five, the higher numbers indicating that precipitation has occurred.

Tables I through III, below, provide a summary of these spot test results.

TABLE I

Spot Testing Results Using ASTM Test Method D 2781 For Unmodified Asphaltene Samples Used As References.

| Sample | Spot Test Rating |
|---|---|
| 1 wt % Asphaltene + 99 wt % Bunker "C" oil | 3 |
| 2 wt % Asphaltene + 98 wt % Bunker "C" oil | 3 |
| 1 wt % Asphaltene + 99 wt % 4:1 wt/wt Light Recycle Gas Oil and Bunker "C" oil | 3 |
| 2 wt % Asphaltene + 98 wt % 4:1 wt/wt Light Recycle Gas Oil and Bunker "C" oil | 3 |

TABLE II

Spot Test Results Using ASTM Test Method D 2781 And A 1 Wt % Sample In A 4:1 wt/wt Blend of Light Recycle Gas Oil And Bunker "C" Oil, Respectively.

| Sample | Spot Test Rating |
|---|---|
| Asphaltene + 1 wt. % blend of (PPG-400) phosphite | 1 |
| Asphaltene + 2 wt. % blend of (PPG-400) phosphite | 1 |
| Asphaltene + 1 wt. % blend of (PPG-1000) phosphite | 1 |
| Asphaltene + 1 wt. % blend of (PPG-400 + PPG-1000) phosphite | 1 |

TABLE III

Spot Test Results Using ASTM Test Method D 2781 For Physical Blends of Trialkyl- Or Triarylphosphite Compounds Prepared In Bunker "C" Oil And Unmodified Asphaltenes.

| Sample | Spot Test Rating |
|---|---|
| Asphaltene + Bunker C oil containing 1 wt % (PPG-400) phosphite | 1 |
| Asphaltene + Bunker C oil containing 2 wt % | 1 |
| Asphaltene + Bunker C oil containing 1 wt % (PPG-1000) Phosphite | 1 |
| Asphaltene + Bunker C oil containing 1 wt % Asphaltene + Bunker C oil (PPG-400 + PPG-1000) phosphite | 1 |

As the forgoing data indicate, this dispersant causes dramatic compatibilization in Bunker "C" oil and Bunker "C" oil blends containing Light Recycle Gas Oil. Less dramatic results are obtained by the incorporation of surface active agents onto asphaltenes. Finally, little emulsifying effect was observed by blending unmodified asphaltenes with Bunker "C" oil and oil blends containing amidated trichlorophosphorous.

We claim:

1. A composition of matter useful as an asphaltene dispersant comprising mixture of:
   (a) poly[di(propylene oxide-400)phosphite]-g-poly(propylene oxide-400) alcohol;
   (b) poly[di(propylene oxide-1000)phosphite]-g-poly(propylene oxide-400) alcohol;
   (c) poly[di(propylene oxide-400)phosphite ]-g-poly(propylene oxide-1000) alcohol;
   (d) poly[di(propylene oxide-1000)phosphite]-g-poly(propylene oxide-1000) alcohol;
   (e) poly{star[di(propylene oxide-400)phosphite]-g-poly(propylene oxide-400)} alcohol;
   (f) poly(star[di(propylene oxide-1000)phosphite]-g-poly(propylene oxide-400)} alcohol;
   (g) poly(star[di(propylene oxide-400)phosphite]-poly(propylene oxide-1000)} alcohol; and
   (h) poly(star[di(propylene oxide-1000)phosphite]-g-poly(propylene oxide-1000)} alcohol.

* * * * *